(12) United States Patent
Leasure

(10) Patent No.: US 11,059,352 B2
(45) Date of Patent: Jul. 13, 2021

(54) METHODS AND SYSTEMS FOR AUGMENTING A VEHICLE POWERED TRANSPORT CLIMATE CONTROL SYSTEM

(71) Applicant: THERMO KING CORPORATION, Minneapolis, MN (US)

(72) Inventor: Mark D. Leasure, Eagan, MN (US)

(73) Assignee: Thermo King Corporation, Minneapolis, MN (US)

( * ) Notice: Subject to any disclaimer, the term of this patent is extended or adjusted under 35 U.S.C. 154(b) by 74 days.

(21) Appl. No.: 16/176,720

(22) Filed: Oct. 31, 2018

(65) Prior Publication Data
US 2020/0130471 A1 Apr. 30, 2020

(51) Int. Cl.
*B60H 1/32* (2006.01)
*B60H 1/00* (2006.01)
(Continued)

(52) U.S. Cl.
CPC ....... *B60H 1/3222* (2013.01); *B60H 1/00428* (2013.01); *B60H 1/3232* (2013.01);
(Continued)

(58) Field of Classification Search
CPC .............. B60H 1/00428; B60H 1/3222; B60H 1/3232; B60L 1/003; B60L 2200/36; B60P 3/20
See application file for complete search history.

(56) References Cited

U.S. PATENT DOCUMENTS

| 3,875,483 A | 4/1975 | Farr |
| 5,104,037 A | 4/1992 | Karg et al. |
| (Continued) | | |

FOREIGN PATENT DOCUMENTS

| CN | 2456117 | 10/2001 |
| CN | 1885660 | 12/2006 |
| (Continued) | | |

OTHER PUBLICATIONS

European Application No. 18382672.6 filed on Sep. 19, 2018 (50 pages).

(Continued)

*Primary Examiner* — Marc E Norman
(74) *Attorney, Agent, or Firm* — Hamre, Schumann, Mueller & Larson, P.C.

(57) ABSTRACT

A method for powering a vehicle powered transport climate control system is provided. The method includes determining an amount of power requested by a load of the vehicle powered transport climate control system. The method also includes determining a vehicle power amount available from a vehicle power network. Also, the method includes calculating an auxiliary power amount from an auxiliary power network to augment the vehicle power amount from the vehicle power network. Further, the method includes converting power from the vehicle power network and power from the auxiliary power network into a load power and supplying the load power to the load of the vehicle powered transport climate control system. Also, a maximum amount of vehicle power available from the vehicle power network is less than a maximum amount of power required by the load of the vehicle powered transport climate control system.

18 Claims, 4 Drawing Sheets

(51) Int. Cl.
*B60L 1/00* (2006.01)
*B60P 3/20* (2006.01)

(52) U.S. Cl.
CPC ............... *B60L 1/003* (2013.01); *B60P 3/20* (2013.01); *B60L 2200/36* (2013.01)

(56) References Cited

U.S. PATENT DOCUMENTS

| | | | |
|---|---|---|---|
| 5,231,849 A | 8/1993 | Rosenblatt | |
| 6,280,320 B1 | 8/2001 | Paschke et al. | |
| 6,487,869 B1 | 12/2002 | Sulc et al. | |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,652,330 B1 | 11/2003 | Wasilewski | |
| 6,688,125 B2 | 2/2004 | Okamoto et al. | |
| 6,753,692 B2 | 6/2004 | Toyomura et al. | |
| 6,925,826 B2 | 8/2005 | Hille et al. | |
| 7,011,902 B2 | 3/2006 | Pearson | |
| 7,120,539 B2 | 10/2006 | Krull et al. | |
| 7,122,923 B2 | 10/2006 | Lafontaine et al. | |
| 7,151,326 B2 | 12/2006 | Jordan | |
| 7,176,658 B2 | 2/2007 | Quazi et al. | |
| 7,206,692 B2 | 4/2007 | Beesley et al. | |
| 7,327,123 B2 | 2/2008 | Faberman et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,745,953 B2 | 6/2010 | Puccetti et al. | |
| 7,806,796 B2 | 10/2010 | Zhu | |
| 7,830,117 B2 | 11/2010 | Ambrosio et al. | |
| 7,898,111 B1 | 3/2011 | Pistel | |
| 7,900,462 B2 | 3/2011 | Hegar et al. | |
| 8,020,651 B2 | 9/2011 | Zillmer et al. | |
| 8,030,880 B2 | 10/2011 | Alston et al. | |
| 8,134,339 B2 | 3/2012 | Burlak et al. | |
| 8,170,886 B2 | 5/2012 | Luff | |
| 8,214,141 B2 | 7/2012 | Froeberg | |
| 8,295,950 B1 | 10/2012 | Wordsworth et al. | |
| 8,381,540 B2 | 2/2013 | Alston | |
| 8,441,228 B2 | 5/2013 | Brabee | |
| 8,476,872 B2 | 7/2013 | Truckenbrod et al. | |
| 8,487,458 B2 | 7/2013 | Steele et al. | |
| 8,541,905 B2 | 9/2013 | Brabee | |
| 8,602,141 B2 | 12/2013 | Yee et al. | |
| 8,626,367 B2 | 1/2014 | Krueger et al. | |
| 8,626,419 B2 | 1/2014 | Mitchell et al. | |
| 8,643,216 B2 | 2/2014 | Lattin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,760,115 B2 | 6/2014 | Kinser et al. | |
| 8,764,469 B2 | 7/2014 | Lamb | |
| 8,818,588 B2 | 8/2014 | Ambrosio et al. | |
| 8,862,356 B2 | 10/2014 | Miller | |
| 8,912,683 B2 | 12/2014 | Dames et al. | |
| 8,924,057 B2 | 12/2014 | Kinser et al. | |
| 8,978,798 B2 | 5/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabee | |
| 9,147,335 B2 | 9/2015 | Raghunathan et al. | |
| 9,199,543 B2 | 12/2015 | Brabee | |
| 9,313,616 B2 | 4/2016 | Mitchell et al. | |
| 9,436,853 B1 | 9/2016 | Meyers | |
| 9,440,507 B2 | 9/2016 | Giovanardi et al. | |
| 9,463,681 B2 | 10/2016 | Olaleye et al. | |
| 9,464,839 B2 | 10/2016 | Rusignuolo et al. | |
| 9,557,100 B2 | 1/2017 | Chopko et al. | |
| 9,562,715 B2 | 2/2017 | Kandasamy | |
| 9,694,697 B2 | 7/2017 | Brabee | |
| 9,738,160 B2 | 8/2017 | Bae et al. | |
| 9,758,013 B2 | 9/2017 | Steele | |
| 9,783,024 B2 | 10/2017 | Connell et al. | |
| 9,784,780 B2 | 10/2017 | Loftus et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,975,403 B2 | 5/2018 | Rusignuolo et al. | |
| 9,975,446 B2 | 5/2018 | Weber | |
| 9,987,906 B2 | 6/2018 | Kennedy | |
| 10,000,122 B2 | 6/2018 | Wu et al. | |
| 10,148,212 B2 | 12/2018 | Schumacher et al. | |
| 10,240,847 B1 | 3/2019 | Thomas, Jr. | |
| 2002/0113576 A1 | 8/2002 | Oomura et al. | |
| 2003/0043607 A1 | 3/2003 | Vinciarelli et al. | |
| 2003/0106332 A1 | 6/2003 | Okamoto et al. | |
| 2003/0200017 A1 | 10/2003 | Capps et al. | |
| 2003/0201097 A1* | 10/2003 | Zeigler | B60H 1/3226 165/240 |
| 2005/0057210 A1 | 3/2005 | Ueda et al. | |
| 2005/0065684 A1 | 3/2005 | Larson et al. | |
| 2006/0284601 A1 | 12/2006 | Salasoo et al. | |
| 2007/0052241 A1 | 3/2007 | Pacy | |
| 2007/0131408 A1* | 6/2007 | Zeigler | B60H 1/323 165/240 |
| 2007/0192116 A1 | 8/2007 | Levitt | |
| 2008/0023965 A1* | 1/2008 | Cagliari | H02K 7/1815 290/1 B |
| 2008/0177678 A1 | 7/2008 | Di Martini et al. | |
| 2008/0281473 A1 | 11/2008 | Pitt | |
| 2009/0121798 A1 | 5/2009 | Levinson | |
| 2009/0126901 A1 | 5/2009 | Hegar et al. | |
| 2009/0178424 A1 | 7/2009 | Hwang et al. | |
| 2009/0195349 A1 | 8/2009 | Frader-Thompson et al. | |
| 2009/0229288 A1 | 9/2009 | Alston et al. | |
| 2009/0314019 A1 | 12/2009 | Fujimoto et al. | |
| 2009/0320515 A1 | 12/2009 | Bischofberger et al. | |
| 2010/0045105 A1 | 2/2010 | Bovio et al. | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0162395 A1 | 7/2011 | Chakiachvili et al. | |
| 2011/0208378 A1 | 8/2011 | Krueger et al. | |
| 2011/0224841 A1 | 9/2011 | Profitt-Brown et al. | |
| 2011/0241420 A1 | 10/2011 | Hering et al. | |
| 2011/0290893 A1 | 12/2011 | Steinberg | |
| 2012/0000212 A1 | 1/2012 | Sanders et al. | |
| 2012/0116931 A1 | 5/2012 | Meyers | |
| 2012/0198866 A1 | 8/2012 | Zeidner | |
| 2012/0310416 A1 | 12/2012 | Tepper et al. | |
| 2013/0000342 A1 | 1/2013 | Blasko et al. | |
| 2013/0088900 A1 | 4/2013 | Park | |
| 2013/0158828 A1 | 6/2013 | McAlister | |
| 2013/0197730 A1 | 8/2013 | Huntzicker | |
| 2013/0231808 A1 | 9/2013 | Flath et al. | |
| 2014/0018969 A1 | 1/2014 | Forbes, Jr. | |
| 2014/0020414 A1* | 1/2014 | Rusignuolo | F25B 27/00 62/115 |
| 2014/0026599 A1 | 1/2014 | Rusignuolo et al. | |
| 2014/0060097 A1 | 3/2014 | Perreault | |
| 2014/0137590 A1 | 5/2014 | Chopko et al. | |
| 2014/0230470 A1 | 8/2014 | Cook | |
| 2014/0265560 A1 | 9/2014 | Leehey et al. | |
| 2015/0019132 A1 | 1/2015 | Gusikhin et al. | |
| 2015/0081212 A1 | 3/2015 | Mitchell et al. | |
| 2015/0121923 A1 | 5/2015 | Rusignuolo et al. | |
| 2015/0168032 A1 | 6/2015 | Steele | |
| 2015/0188360 A1 | 7/2015 | Doane et al. | |
| 2015/0231948 A1* | 8/2015 | Kennedy | B60H 1/3222 62/56 |
| 2015/0246593 A1 | 9/2015 | Larson et al. | |
| 2015/0316301 A1 | 11/2015 | Kolda et al. | |
| 2015/0345958 A1 | 12/2015 | Graham | |
| 2015/0355288 A1 | 12/2015 | Yokoyama et al. | |
| 2015/0360568 A1 | 12/2015 | Champagne et al. | |
| 2016/0011001 A1 | 1/2016 | Emory et al. | |

(56) References Cited

U.S. PATENT DOCUMENTS

| | | |
|---|---|---|
| 2016/0035152 A1 | 2/2016 | Kargupta |
| 2016/0089994 A1 | 3/2016 | Keller et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0219374 A1 | 8/2017 | Sitarski et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0170398 A1* | 6/2018 | Miller ............... B60H 1/00828 |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0238698 A1 | 8/2018 | Pedersen |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2020/0050753 A1 | 2/2020 | Davis et al. |
| 2020/0086712 A1* | 3/2020 | Schumacher ...... B60H 1/00885 |
| 2020/0086744 A1 | 3/2020 | Schumacher et al. |
| 2020/0101820 A1 | 4/2020 | Wenger et al. |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/005957 | 1/2018 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018/204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

European Application No. 18382673.4 filed on Sep. 19, 2018 (68 pages).
Extended European Search Report, issued in the corresponding European patent application No. EP 19205718, dated Mar. 2, 2020, 7 pages.
Yang et al., "The Role of Thermal Plume in Person-to-Person Contaminant Cross Transmission", 2017 Winter Conference, Seminar 36; Modeling and Control of the Personal Microenvironment, 5 pages.
"Lamberet Smart Reefer on Solutrans", Zoeken, Jul. 28, 2015, 7 pages, available at: https://iepieleaks.nl/lamberet-smart-reefer-solutrans/.
U.S. Appl. No. 16/178,067, titled "Methods and Systems for Generation and Utilization of Supplemental Stored Energy for Use in Transport Climate Control", filed Nov. 1, 2018, 35 pages.
U.S. Appl. No. 16/565,063, titled "System and Method for Managing Power and Efficiently Sourcing a Variable Voltage for a Transport Climate Control System", filed Sep. 9, 2019, 59 pages.

(56) References Cited

OTHER PUBLICATIONS

U.S. Appl. No. 16/574,754, titled "Methods and Systems for Energy Management of a Transport Climate Control System", filed Sep. 18, 2019, 50 pages.
U.S. Appl. No. 16/574,775, titled "Methods and Systems for Power and Load Management of a Transport Climate Control System", filed Sep. 18, 2019, 68 pages.
European Patent Application No. 18382672.6, titled "Methods and Systems for Energy Management of a Transport Climate Control System", filed Sep. 19, 2018, 50 pages.
European Patent Application No. 18382673.4 titled "Methods and Systems for Power and Load Management of a Transport Climate Control System", filed Sep. 19, 2018, 68 pages.
U.S. Appl. No. 16/176,802, titled "Methods and Systems for Controlling a Mild Hybrid System That Powers a Transport Climate Control System", filed Oct. 31, 2018, 31 pages.
U.S. Appl. No. 16/236,938, titled "Systems and Methods for Smart Load Shedding of a Transport Vehicle While in Transit", filed Dec. 31, 2018, 39 pages.
U.S. Appl. No. 16/176,667, titled "Drive Off Protection System and Method for Preventing Drive Off", filed Oct. 31, 2018, 41 pages.
U.S. Appl. No. 16/176,602, titled "Reconfigurable Utility Power Input With Passive Voltage Booster", filed Oct. 31, 2018, 39 pages.
U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.
U.S. Appl. No. 16/235,865, titled "Methods and Systems for Preserving Autonomous Operation of a Transport Climate Control System", filed Dec. 28, 2018, 41 pages.
PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,110, titled "Transport Climate Control System With a Self-Configuring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution to Transport Climate Control Systems Amongst One or More Electric Supply Equipment Stations ", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,205, titled "Transport Climate Control System With an Accessory Power Distribution Unit for Managing Transport Climate Control Loads", filed Sep. 9, 2019, 54 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management for a Plurality of Transport Climate Control Systems", filed Sep. 9, 2019, 44 pages.
U.S. Appl. No. 16/565,282, titled "Optimized Power Cord for Transferring Power to a Transport Climate Control System", filed Sep. 9, 2019, 43 pages.
U.S. Appl. No. 16/147,708, titled "Methods and Systems for Autonomous Climate Control Optimization of a Transport Vehicle", filed Sep. 29, 2018, 41 pages.

* cited by examiner

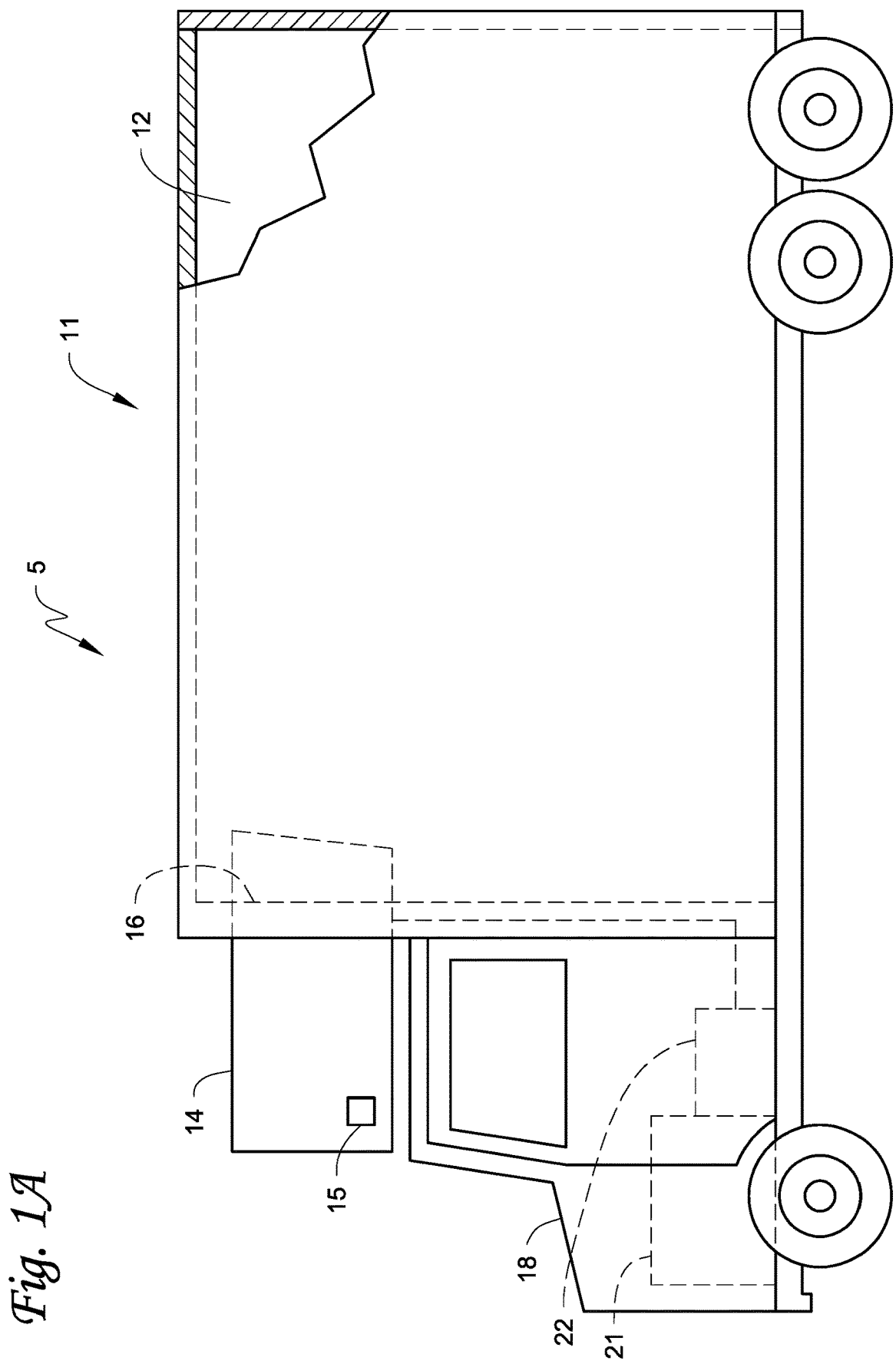

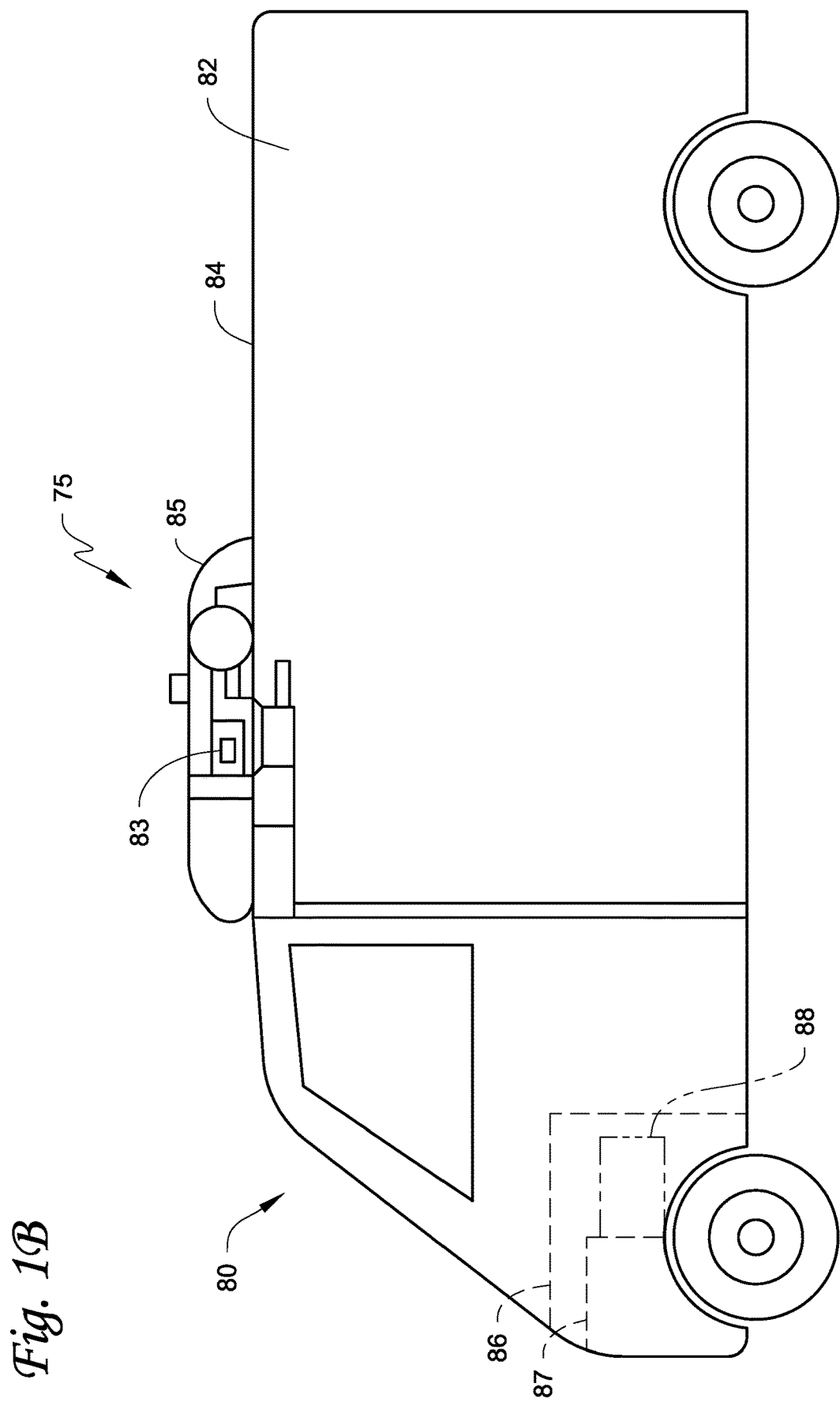

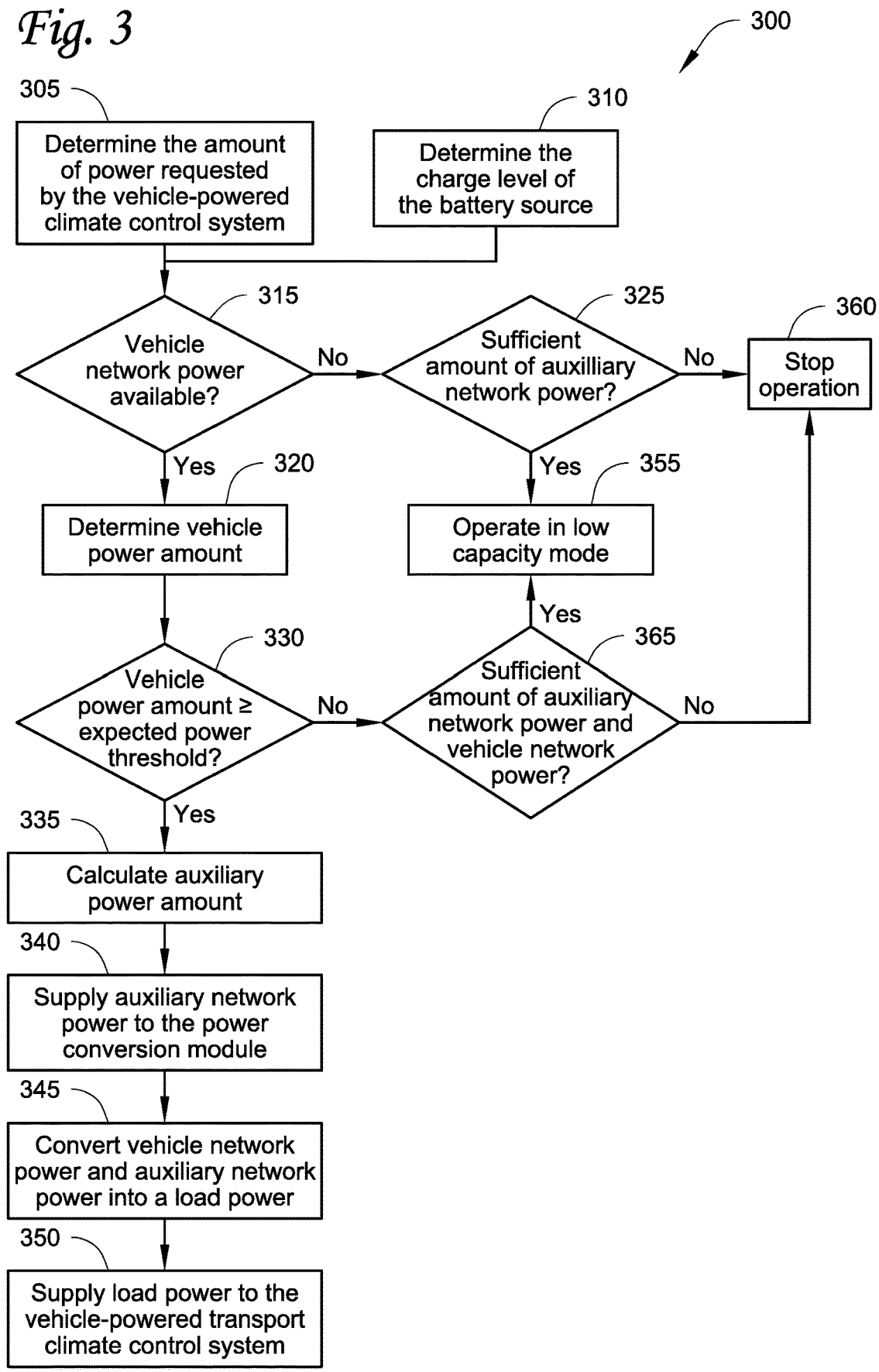

METHODS AND SYSTEMS FOR AUGMENTING A VEHICLE POWERED TRANSPORT CLIMATE CONTROL SYSTEM

FIELD

This disclosure relates to a vehicle powered transport climate control system. More particularly, this disclosure is directed to methods and systems for augmenting a vehicle powered transport climate control system.

BACKGROUND

A transport climate control system can include, for example, a transport refrigeration system (TRS). A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.).

SUMMARY

This disclosure relates to a vehicle powered transport climate control system. More particularly, this disclosure is directed to methods and systems for augmenting a vehicle powered transport climate control system.

Regulations to reduce emissions (e.g., particulate matter emissions, nitrogen oxide emissions, noise emissions, etc.), for example, from a vehicle prime mover (e.g., a combustion engine such as a diesel engine, etc.), have led to components within the vehicle being electrically driven and the addition of emission reducing components (e.g., emission control devices, an auto start-stop system, etc.) in the space between the vehicle machine and the prime mover within a vehicle power bay. Vehicle power bays may also include an auto start-stop system that can shut the prime mover off (i.e., the prime mover is not running) when, for example, the vehicle stops at a traffic light, stops at a store, etc. Accordingly, the amount of space between the vehicle machine and the prime mover in the vehicle power bay that is available for other components is shrinking. For example, this reduced space can make it difficult to provide a separate compressor coupled to (or tied to, mounted to) the prime mover in the vehicle power bay to provide for high cooling power load and supplement a vehicle powered transport climate control system. Also, for example, this reduced space can make it difficult to provide a separate energy source (e.g., prime mover, fuel cell, battery source, etc.) in the vehicle power bay that is provided to exclusively power a vehicle powered transport climate control system.

The embodiments described herein are directed to a vehicle powered transport climate control system in which the power supplied from the vehicle (i.e., the vehicle power network) is never sufficient to completely power the vehicle powered transport climate control system operating at a full capacity. A power system can augment power supplied from the vehicle (i.e., a vehicle power network) with power from an auxiliary power network to power the vehicle powered transport climate control system.

In one embodiment, a method for powering a vehicle powered transport climate control system that includes a vehicle power network and an auxiliary power network is provided. The method includes determining an amount of power requested by a load of the vehicle powered transport climate control system. The method also includes determining a vehicle power amount available from the vehicle power network. Also, the method includes calculating an auxiliary power amount from the auxiliary power network to augment the vehicle power amount from the vehicle power network. Further, the method includes converting power from the vehicle power network and power from the auxiliary power network into a load power and supplying the load power to the load of the vehicle powered transport climate control system. Also, a maximum amount of vehicle power available from the vehicle power network is less than a maximum amount of power required by the load of the vehicle powered transport climate control system.

In another embodiment, a refrigerated transport unit is provided. The refrigerated transport unit includes a vehicle powered transport climate control system for providing climate control to an internal space of the refrigerated transport unit, and a power system for powering the vehicle powered transport climate control system. The vehicle powered transport climate control system includes a refrigeration circuit that includes a compressor, an evaporator, a condenser and an expansion valve. The power system includes a power conversion module and a controller. The power conversion module is configured to receive power from a vehicle power network that is configured to power a vehicle that tows the refrigerated transport unit and from an auxiliary power network. The controller is configured to determine an amount of power requested by a load of the vehicle powered transport climate control system, determine a vehicle power amount available from the vehicle power network, and calculate an auxiliary power amount from the auxiliary power network to augment the vehicle power amount from the vehicle power network. The power conversion module is also configured to convert power from the vehicle power network and power from the auxiliary power network into a load power, and configured to supply the load power to the load of the vehicle powered transport climate control system. Also, a maximum amount of vehicle power available from the vehicle power network is less than a maximum amount of power required by the load of the vehicle powered transport climate control system.

DRAWINGS

Reference is made to the accompanying drawings that form a part of this disclosure and illustrate embodiment(s) in which the systems and methods described herein may be practiced.

FIG. 1A illustrates a side view of a truck with a vehicle powered transport climate control system, according to one embodiment.

FIG. 1B illustrates a side view of a van with a vehicle powered transport climate control system, according to one embodiment.

FIG. 3 illustrates a flowchart of a method for powering a vehicle powered transport climate control system, according to one embodiment.

Like reference numbers represent like parts throughout.

DETAILED DESCRIPTION

Figure 2:
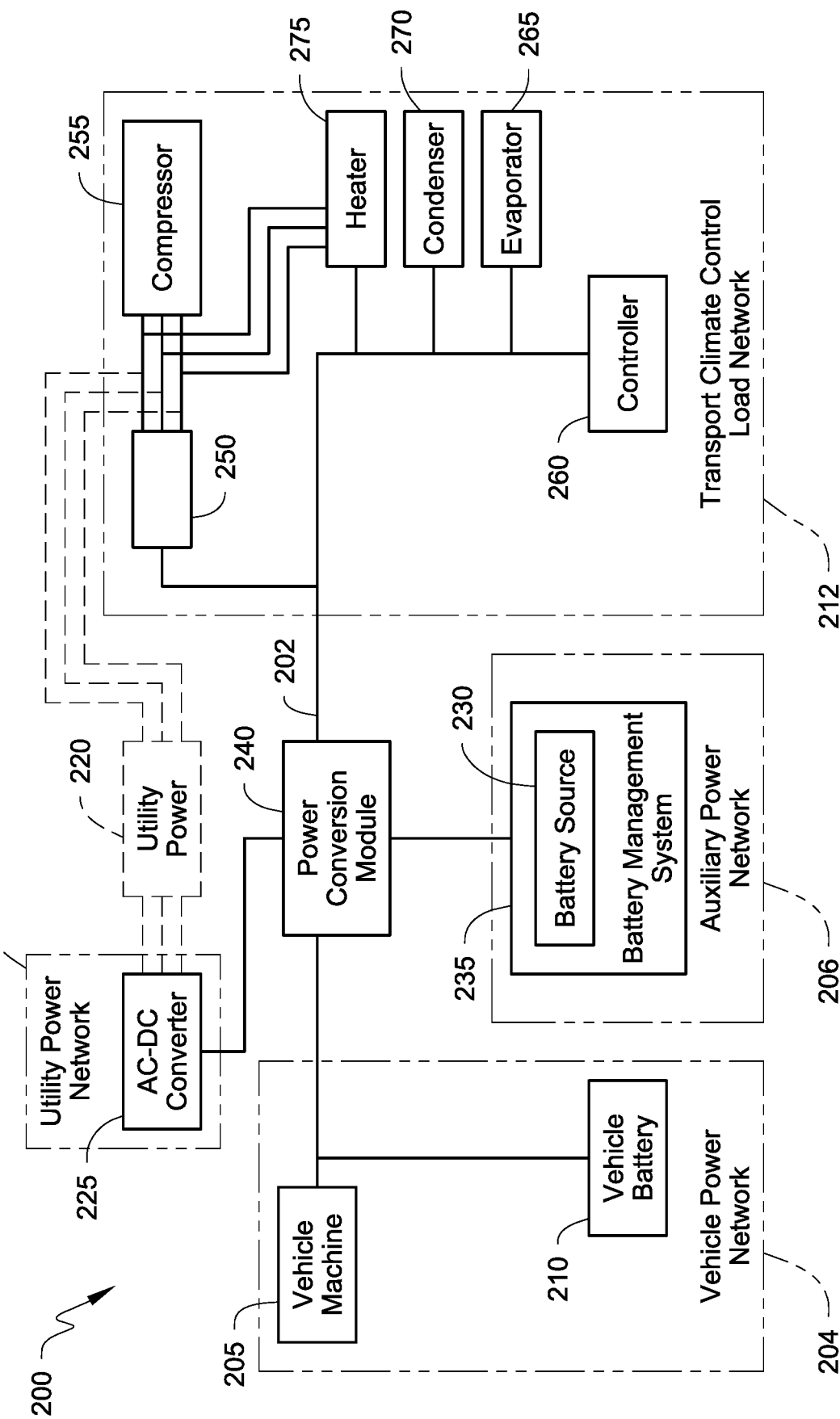
FIG. 2 illustrates a block diagram schematic of one embodiment of a power system for powering a vehicle powered transport climate control system, according to one embodiment.

This disclosure relates to a vehicle powered transport climate control system. More particularly, this disclosure is directed to methods and systems for augmenting a vehicle powered transport climate control system.

A vehicle powered transport climate control system, as defined herein, refers to a transport climate control system that does not have its own power source (e.g., prime mover, battery source, etc.) that can exclusively power the transport climate control system when operating at a full capacity. The vehicle powered transport climate control system primarily relies on power from the vehicle (i.e., a vehicle power network) to power the vehicle powered transport climate control system.

In some embodiments, the vehicle powered transport climate control system can include a transport refrigeration unit that does not have sufficient room to house a prime mover.

As defined herein, "low voltage" refers Class A of the ISO 6469-3 in the automotive environment. In particular, a maximum working voltage of between 0V and 60V DC or between 0V and 30V AC.

As defined herein, "high voltage" refers Class B of the ISO 6469-3 in the automotive environment. In particular, a maximum working voltage of between 60V and 1500V DC or between 30V and 1000V AC.

As defined herein "underpowered vehicle network power" or "vehicle network power that is underpowered" means that a maximum power available from the vehicle power network will never be sufficient to run a vehicle powered transport climate control system when operating at a full capacity.

As defined herein, a limited capacity mode is a mode of operation of a vehicle powered transport climate control system in which a speed of at least one of a compressor, one or more evaporator fans, one or more condenser fans is reduced in order to reduce a power demand of the vehicle powered transport climate control system.

FIG. 1A depicts a climate-controlled straight truck 11 that includes a conditioned load space 12 for carrying cargo. The truck 11 includes a vehicle powered transport climate control system 5. The vehicle powered transport climate control system 5 includes a transport refrigeration unit (TRU) 14 that is mounted to a front wall 16 of the load space 12.

The TRU 14 includes a refrigeration circuit (not shown) including, for example, a compressor, a condenser, an evaporator, and an expansion valve. The TRU 14 can also include a heater, one or more evaporator fans, one or more condenser fans, one or more solenoid valves, etc. that assist in providing climate control (temperature, humidity, air quality, etc.) into the conditioned load space 12. The TRU 14 is controlled via a controller 15 to provide climate control within the load space 12. It will be appreciated that the TRU 14 does not have sufficient space to house a power source (e.g., prime mover, batter power source, fuel cell, etc.) that can exclusively power the vehicle powered transport climate control system 5.

The truck 11 further includes a vehicle power bay 18, which houses a prime mover 21, such as a combustion engine (e.g., diesel engine, etc.), that provides power to move the truck 11 and to operate the vehicle powered transport climate control system 5. The prime mover 21 can work in combination with an optional machine 22 (e.g., an alternator, a generator, etc.) to power the vehicle powered transport climate control system 5.

In some embodiments, the truck 11 can be a hybrid vehicle that is powered by the prime mover 21 in combination with a battery power source (not shown) or can be an electrically driven truck in which the prime mover 21 is replaced with an electric power source (e.g., a battery power source).

It will be appreciated that a power source of the truck 11 (e.g., the prime mover 21, the optional machine 22, an electric power source, etc.) cannot exclusively power the vehicle powered transport climate control system 5 when operating at a full capacity.

While FIG. 1A illustrates a climate-controlled straight truck 11, it will be appreciated that the embodiments described herein can also apply to any other type of transport unit including, but not limited to, a container (such as a container on a flat car, an intermodal container, etc.), a box car, or other similar transport unit.

FIG. 1B depicts a temperature-controlled van 80 that includes a conditioned load space 82 (or internal space) for carrying cargo. The van 80 includes a vehicle powered transport climate control system 75. The vehicle powered transport climate controlled system 75 includes a TRU 85 that is mounted to a rooftop 84 of the load space 82. The TRU 85 is controlled via a controller 83 to provide climate control (e.g., temperature, humidity, air quality, etc.) within the load space 82. It will be appreciated that the TRU 85 does not have sufficient space to house a power source (e.g., prime mover, batter power source, fuel cell, etc.) that can exclusively power the vehicle powered transport climate control system 75.

The van 80 further includes a vehicle power bay 86, which houses a prime mover 87, such as an internal combustion engine (e.g., diesel engine, etc.), that provides power to move the van 80 and to operate the vehicle powered transport climate control system 75. In some embodiments, the prime mover 87 can work in combination with an optional machine 88 (e.g., an alternator, a generator, etc.) to operate the vehicle powered transport climate control system 75. Also, in some embodiments, the van 80 can be a hybrid vehicle that is powered by the prime mover 87 in combination with a battery power source (not shown) or can be an electrically driven truck in which the prime mover 87 is replaced with an electric power source (e.g., a battery power source).

It will be appreciated that a power source of the van 80 (e.g., the prime mover 87, the optional machine 88, an electric power source, etc.) cannot exclusively power the vehicle powered transport climate control system 75 when operating at a full capacity.

FIG. 2 illustrates a block diagram schematic of one embodiment of a power system 200 for powering a vehicle powered transport climate control system. The power system 200 can power the vehicle powered transport climate control systems 5, 75 shown in FIGS. 1A and 1B. The power system 200 is configured to operate with a prime mover powered vehicle. However, it will be appreciated that the power system 200 can also be configured to operate with an electric vehicle powered by an energy storage device (e.g., one or more batteries) and/or a hybrid vehicle powered by a combination of a prime mover and an energy storage device.

As shown in FIG. 2, the power system 200 includes a vehicle power network 204, an auxiliary power network 206, a utility power network 208, and a transport climate control load network 212 connected to a power conversion module 240.

The power system 200 can augment vehicle network power that is underpowered from one or more energy sources from the vehicle power network 204 with auxiliary network power from the auxiliary power network 206 via the power conversion module 240 to power the transport climate control load network 212. The one or more energy sources can include a vehicle battery 210 and a vehicle machine 205 via the vehicle power network 204, and one or more auxiliary batteries 230 via the auxiliary power network 206. The loads can be, for example, a compressor 255, one or more evaporator blowers 265, one or more condenser fans 270, a heater 275, and a controller 260 of a vehicle powered transport climate control system. The loads can also include, for example, one or more sensors, one or more valves, one or more solenoids, etc. of the transport climate control system. It will be appreciated that in some embodiments, the compressor 255 can require the most amount of power of the vehicle powered transport climate control system.

The vehicle power network 204 is configured to provide a vehicle network power that is underpowered to the power conversion module 240. The vehicle power network 204 includes the vehicle battery 210 and the vehicle machine 205. The vehicle battery 210 can be used, for example, for starting a vehicle prime mover, running lights, powering vehicle accessory components, etc. In some embodiments, the vehicle battery 210 can also be used to power components of the transport climate control load network 212. It will be appreciated that vehicle network power provided by the vehicle power network 204 can be inconsistent and based on operation and vehicle load requirements of the vehicle. Accordingly, the vehicle network power can continuously fluctuate. Also, it will be appreciated that the maximum vehicle network power that is available to the power system 200 will never be sufficient to operate the vehicle powered transport climate control system operating at a full capacity.

The vehicle machine 205 can be an electrical generator that can provide DC power to the vehicle. In some embodiments, the vehicle machine 205 can include an alternator and a rectifier or an AC-DC converter (not shown) that rectifies or converts the AC power to a DC power.

It will be appreciated that in electric vehicles, there may be no machine. Electric vehicles can include a motor generator and a high voltage (e.g., in a range between 60V and 1500V; for example 400V, 800V, etc.) DC battery to run the vehicle. Electric vehicles can also provide a relatively high voltage (e.g., 400V, 800V, etc.) DC power source (e.g., a battery pack, a rechargeable energy storage system (RESS), etc.). Electric vehicles can include one or more DC-DC converters (e.g., two DC-DC convertors) to convert the relatively high voltage (e.g., 400V, 800V, etc.) to a low voltage (e.g., in a range between 0V and 60V; for example 12V). That is, the vehicle machine 205 can be replaced with a DC-DC converter having similar parameters as the vehicle machine 205 in order to be able to provide a vehicle network power that is underpowered to the power conversion module 240. The underpowered vehicle network power can be used to power vehicle accessory components (e.g., electronic communication devices, cabin lights, a primary and/or secondary HVAC system, primary and/or secondary HVAC fan(s), sunshade(s) for a window/windshield of the vehicle 10, cabin accessories, etc.).

In some embodiments, the converted low voltage (e.g. 12V) from the vehicle power network 204 can be provided to the power conversion module 240 for powering the transport climate control load network 212. In some embodiments, an electric vehicle can provide for example, 7 kW-Hour energy from a 45 kW-Hour storage of the vehicle power network 204 to the power conversion module 240 to run the transport climate control load network 212. It will be appreciated that the embodiments disclosed herein are directed to a low voltage (e.g., 12V) system. Embodiments disclosed herein can use take off power (e.g., electric power take off or ePTO) from the low voltage (for example, 12V) system for loads such as vehicle accessory components and/or the power conversion module 240. The high voltage power can provide power for driving the vehicle (e.g., transmission power take off) and the power system 200 herein may not take electric power from the high voltage system.

It will be appreciated that in a hybrid vehicle, there may be a machine (such as the vehicle machine 205) and/or a low voltage DC power source that can provide a low voltage (e.g., 12V) to the power conversion module 240.

It will be appreciated that any type of power source from the vehicle that can provide power to the power system 200 can be part of the vehicle power network 204. This can include, for example, the vehicle machine 205, the vehicle battery 210, a RESS, a generator, an axle-mounted generator, a power take off (PTO) device or ePTO device with an auxiliary converter, etc.

In some embodiments, a voltage sensor (not shown) can be provided in the vehicle power network 204 to monitor a vehicle voltage provided to the power conversion module 240. Also, in some embodiments, a current sensor (not shown) can be provided to monitor the current to the power conversion module 240.

The auxiliary power network 206 includes a battery source 230 and a battery management system 235. In some embodiments, the auxiliary power network 206 can be part of the vehicle powered transport climate control system and potentially housed within a transport refrigeration unit. In other embodiments, the auxiliary power network 206 can be external to the vehicle powered transport climate control system and part of the vehicle power network 204. In yet some other embodiments, the auxiliary power network 206 can be external to the vehicle powered transport climate control system and external to the vehicle power network 204. For example, the auxiliary power network 206 can be part of an auxiliary power unit (APU) that is mounted to the vehicle.

In some embodiments, the battery source 230 can include one or more batteries. For example, in one embodiment the battery source 230 can include two batteries (not shown). Each of the batteries can also be connected to the power conversion module 240. It will be appreciated that the battery source 230 can provide sufficient energy to power the transport climate control load network 212 by itself. In some embodiments, the battery source 230 can provide 12 VDC or 24 VDC. In other embodiments, the battery source 230 can provide 48 VDC.

The battery management system 235 is configured to monitor a charge level of the one or more batteries of the battery source 230 and charge the one or more batteries of the battery source 230. The battery management system 235 can communicate with, for example, the controller 260 and/or a controller (not shown) of the power conversion module 240 to provide a charge level of one or more batteries of the battery source 230. Also, the battery management system 235 can receive instructions from, for example, the controller 260 and/or the controller of the power conversion module 240 indicating the amount of power from the battery source 230 should be supplied to the power conversion module 240.

The power conversion module 240 is configured to convert a power from both of the vehicle power network 204 and the auxiliary power network 206 to a load power compatible with one or more loads of the transport climate control load network 212. That is, the power conversion module 240 is configured to buck or boost power from the vehicle power network 204 and is configured to buck or boost power from the auxiliary power network 206 to obtain the desired load power. In some embodiments, the power conversion module 240 can include one or more DC/DC converters. For example, the power conversion module 240 can include one DC/DC converter to convert the underpowered vehicle network power to a voltage compatible with one or more loads of the transport climate control load network 212 and a second DC/DC converter to convert the auxiliary network power to a voltage compatible with one or more loads of the transport climate control load network 212. The converted power from the vehicle power network 204 and the converted power from the auxiliary power network 206 are combined to obtain the load power compatible with one or more loads of the transport climate control load network 212. The load power outputted by the power conversion module 240 is then provided on a load DC bus 202 to the transport climate control load network 212. In some embodiments, the load power can be a low voltage DC power (e.g., between 0-60V DC). In other embodiments, the load power can be a high voltage DC power (e.g., between 60-1500V DC).

In some embodiments, the power conversion module 240 can include a controller (not shown) configured to monitor and control the power conversion module 240. In some embodiments, the controller can communicate with the controller 260.

The power system 200, and particularly the power conversion module 240, is controlled by the controller 260 of the transport climate control load network 212. The controller 260 can be, for example, the controller 15 shown in FIG. 1A or the controller 83 shown in FIG. 1B. In some embodiments, the power conversion module 240 can monitor the amount of current and/or voltage provided by the vehicle power network 204. Also, in some embodiments, the power conversion module 240 can monitor the amount of current and/or voltage drawn by components of the transport climate control load network 212. The power conversion module 240 can be configured to communicate the amount of current and/or voltage provided by the vehicle power network 204 and the amount of current and/or voltage drawn by components of the transport climate control load network 212.

Components of the transport climate control load network 212 can be, for example, part of a TRU that is mounted to the body of the vehicle (for example, truck, van, etc.). In some embodiments, the TRU can be above the cab of the truck (as shown in FIG. 1A). In another embodiment, the TRU can be on the top of the TU (for example, a top of a box where the external condensers are located) (see FIG. 1B). In some embodiments, the components of the transport climate control load network 212 can be DC powered components. In some embodiments, the components of the transport climate control load network 212 can be AC powered components. In some embodiments, the transport climate control load network 212 can include both DC powered components and AC powered components.

As shown in FIG. 2, the transport climate control load network 212 includes a compressor 255, one or more evaporator blowers 265, one or more condenser fans 270, the heater 275, and the controller 260. The transport climate control load network 212 also includes an inverter 250 that is configured to boost the load power and convert the boosted load power to an AC load power. That is, the inverter 250 is configured to boost power from the DC load bus 202 and converts the power to AC power to drive the compressor 255. In some embodiments, the inverter 250 can convert the load power to a high voltage AC power. As shown in FIG. 2, the inverter 250 is configured to power the compressor 255 and optionally the heater 275. It will be appreciated that in other embodiments, the inverter 250 can power other components of the transport climate control load network 212 such as, for example, the one or more evaporator blowers 265, the one or more condenser fans 270, etc. In some embodiments, the inverter 250 can be a Compressor Drive Module (CDM).

In some embodiments, the inverter 250 can convert low voltage DC power (for example, 12 VDC, 24 VDC, 48 VDC) from the load DC bus 202 and provide AC power (for example, 230 VAC three phase, 460 VAC three phase, etc.) to drive the compressor 255. In particular, the inverter 250 drives the compressor 255 to meet demand of the transport climate control system.

The load DC bus 202 is connected to and powers each of the inverter 250, the one or more evaporator blowers 265, the one or more condenser fans 270, the heater 275, and the controller 260. It will be appreciated that the inverter 250 with the compressor 255 can require the most power of the various loads of the transport climate control load network 212. As shown in FIG. 2, in some embodiments, the inverter 250 can also power the heater 275.

The utility power network 208 is configured to charge a battery source 230 of the auxiliary power network 206 when the vehicle is parked and has access to a utility power source 220. In some embodiments, the utility power network 208 can also provide power to operate the transport climate control load network 212 when the vehicle is parked and has access to a utility power source. The utility power network 208 includes the AC-DC converter 225. The utility power source (e.g., shore power, etc.) 220 can be connected to the AC-DC converter 225 to provide AC power input to the AC-DC converter 225. The AC-DC converter 225 converts the AC power from the utility power source 220 and provides converted DC power to the power conversion module 240.

While FIG. 2 shows a single AC-DC converter 225, it is appreciated that in other embodiments the power system 200 can includes two or more AC-DC converters. In embodiments where there are two or more AC-DC converters, each of the AC-DC converters can be connected to the utility power 220 to provide additional power capacity to the power system 200. In some embodiments, each of the AC-DC converters can provide different amounts of power. In some embodiments, each of the AC-DC converters can provide the same amount of power.

In some embodiments, the utility power 220 can be connected directly to the compressor 255 and provide power to drive the compressor 255 thereby bypassing the inverter 250. In some embodiments, the inverter 250 can be used as an AC-DC converter and convert power received from the utility power 220 into DC power that can be provided by the inverter 250 to the load DC bus 202.

In some embodiments, the compressor 255 can be a variable speed compressor. In some embodiments, the compressor 255 can require, for example, 1 KW of power to operate. In some embodiments, the one or more evaporator blowers 265 can require, for example, 100 W of power to operate. In some embodiments, the one or more condenser fans 270 can require, for example, 130 W of power to operate. In some embodiments, the heater 275 can require, for example, 1200 W of power to operate. Also, in some embodiments, the heater 275 can be configured to receive power from the CDM 250. While the compressor 255 shown in FIG. 2 is powered by AC power, it will be appreciated that in other embodiments the compressor 255 can be powered by DC power.

When the compressor 255 and/or the heater 275 are powered directly by the utility power 220, the compressor 255 and/or the heater 275 can be turned on and off (e.g., operate in a cycle sentry mode) in order to control the amount of cooling provided by the compressor 255 and/or the amount of heating provided by the heater 275.

The controller 260 is configured to monitor and control operation of the vehicle powered transport climate control system. In particular, the controller 260 can control operation of the compressor 255, the heater 275, the one or more condenser fans 270, the one or more evaporator blowers 265 and any other components of the vehicle powered transport climate control system. In some embodiments, the controller 260 can monitor the amount of power drawn by the components of the transport climate control load network 212. The controller 260 can also be configured to control the power system 200. Control of the power system 200 is discussed below with respect to FIG. 3.

FIG. 3 illustrates a flowchart of a method 300 for powering a vehicle powered transport climate control system (e.g., the vehicle powered transport climate control systems 5, 75) and particularly the transport climate control load network 212, according to one embodiment.

As discussed below, the method 300 is performed by the controller 260. However, in other embodiments, the method 300 can be performed by a controller of the power conversion module 240, the battery management system 235, or a separate controller of the power system 200. Further, in some embodiments, the method 300 can be performed by any combination of the controller 260, a controller of the power conversion module 240, the battery management system 235, and a separate controller of the power system 200.

The method begins concurrently at 305 and 310. At 305, the controller 260 determines the amount of power requested by the transport climate control load network 212. In some embodiments, the controller 260 can determine the amount of power requested by the transport climate control load network 212 based on the current operating mode of the vehicle powered transport climate control system. That is, based on the current operating mode, the controller 260 can determine the amount of power requested by the compressor 255, the heater 275, the one or more condenser fans 270 and the one or more evaporator blowers 265. The controller 260 can use, for example, look up tables, simulation data, etc. to determine how much power is requested by each of the components of the transport climate control load network 212 to run in the current operating mode.

At 310, the controller 260 determines the amount of power available from the auxiliary power network 206. In some embodiments, this includes determining the charge level of the battery source 230. In some embodiments, the controller 260 can receive the charge level from the battery management system 235.

Once the controller 260 determines the amount of power requested at 305 and determines the amount of power available from the auxiliary power network 206 at 310, the method then proceeds to 315. While FIG. 3 shows 305 and 310 being performed concurrently, it will be appreciated that in other embodiments 305 and 310 can be performed sequentially in either order.

At 315, the controller 260 determines whether vehicle network power from the vehicle power network 204 is available to the power system 200. In some embodiments, the controller 260 can receive information from the power conversion module 240 indicating that vehicle network power is being provided by the vehicle power network 204. In some embodiments, the controller 260 can receive information from one or more sensors of the vehicle power network 204 and/or the vehicle to determine whether vehicle network power is available from the vehicle power network 204. When vehicle network power is available from the vehicle power network 204, the method 300 proceeds to 320. When vehicle network power is not available from the vehicle power network 204, the method 300 proceeds to 325.

At 320, the controller 260 determines a vehicle power amount provided by the vehicle power network 204 to the power system 200. The power system 200 may not be able to control the vehicle power amount provided by the vehicle. Also, it will be appreciated, that the vehicle power amount can fluctuate while the vehicle is in transit. For example, the power sources of the vehicle may generate, for example, 2-5 kW of power at any given time while in operation, but may only supply the vehicle power network 204 a certain amount of that power based on the operating conditions of the vehicle. In some embodiments, the controller 260 can receive information from the power conversion module 240 indicating that vehicle power amount provided by the vehicle power network 204 to the power system 200. In some embodiments, the controller 260 can receive information from one or more sensors of the vehicle power network 204 and/or the vehicle to determine the vehicle power amount provided by the vehicle power network 204 to the power system 200. The method 300 then proceeds to 330.

At 330, the controller 260 determines whether the vehicle power amount determined at 320 is at or above an expected power threshold. The expected power threshold can be a predetermined value stored in memory that indicates an expected amount of power that should be available from the vehicle power network 204 based on the particular vehicle in transit. In some embodiments, the expected power threshold can be, for example, 1 kW. It will be appreciated that when the amount of vehicle network power meets or exceeds the expected power threshold, the power system 200 is capable of augmenting the power provided by the vehicle power network 204 with power from the auxiliary power network 206 to operate the vehicle powered transport climate control system at a full capacity. When the amount of vehicle network power provided by the vehicle power network 204 is at or above the expected power threshold, the method 300 proceeds to 335. When the amount of vehicle network power provided by the vehicle power network 204 is below the expected power threshold, the method 300 proceeds to 365.

At 335, the controller 260 calculates an auxiliary power amount to be provided by the auxiliary power network 206 so as to augment the amount of power available from the vehicle power network 204 to meet the amount of power requested by the transport climate control load network 212. In some embodiments, the controller 260 can calculate the auxiliary power amount based on the vehicle power amount available from the vehicle power network 204 (determined at 320) and the amount of power requested by the transport climate control load network 212 (determined at 305). The method 300 then proceeds to 340.

At 340, the controller 260 instructs the auxiliary power network 206 (e.g., the battery storage system 235) to augment the vehicle power amount by supplying the auxiliary power amount of power determined at 335 from the battery source 230 to the power conversion module 240. The method 300 then proceeds to 345.

At 345, the power conversion module 240 is configured to convert power supplied by the vehicle power network 204 and power supplied by the auxiliary network 206 to a load power compatible with one or more loads of the transport climate control load network 212. Converting the power supplied by the vehicle power network 204 and the power supplied by the auxiliary network 206 to the load power includes converting the power from the vehicle power network from a vehicle network voltage to a load power voltage and converting the power from the auxiliary power network from an auxiliary network voltage to the load power voltage. In some embodiments, this can include converting the power from the vehicle power network from a vehicle network DC voltage to a load power DC voltage and converting the power from the auxiliary power network from an auxiliary network DC voltage to the load power DC voltage.

At 350, the power conversion module 240 supplies the load power via the load DC bus 202 to the transport climate control load network 212. In some embodiments, a portion of the load power supplied to the load DC bus 220 can be sent to the inverter 250 to boost the portion of the load power and converts the boosted load power to AC power to drive one or more components of the transport climate control load network 212 including for example, one or more of the compressor 255 and the heater 275. The method 300 can then proceed back to 305, 310.

At 325, the controller 260 determines whether the auxiliary power network 206 can supply a sufficient amount of power to operate the vehicle powered transport climate control system in a limited capacity mode. When the auxiliary power network 206 can supply a sufficient amount of power to operate the vehicle powered transport climate control system in the limited capacity mode, the method proceeds to 355. When the auxiliary power network 206 cannot supply a sufficient amount of power to operate the vehicle powered transport climate control system in the limited capacity mode, the method proceeds to 360.

At 355, the controller 260 powers the transport climate control load network 212 so that the vehicle powered transport climate control system can operate in the limited capacity mode. In particular, the controller 260 can instruct the vehicle powered transport climate control system to operate in a limited capacity mode. The controller 260 can also instruct the auxiliary power network 206 (e.g., the battery storage system 235) to supply power from the battery source 230 to the power conversion module 240. The amount of power supplied by the auxiliary power network 206 can be based on the amount of power required for the vehicle powered transport climate control system to operate in the limited capacity mode. The power conversion module 240 can then convert the power received from the auxiliary power network 206 and any power received from the vehicle power network 204 to a load power compatible with one or more loads of the transport climate control load network 212. The power conversion module 240 can then supply the load power via the load DC bus 202 to the transport climate control load network 212. In some embodiments, the controller 260 can send or display a notification to a user or customer that the vehicle powered transport climate control system is operating in a limited capacity mode and optionally alert the user or customer that the power system 200 may not have sufficient power to operate the vehicle powered transport climate control system after a certain period of time. The method 300 can then proceed back to 305, 310.

At 360, the controller 260 is configured to stop operation of the power system 200 and/or the vehicle powered transport climate control system and send or display a notification or alert to a user or customer that there is insufficient power available to operate the vehicle powered transport climate control system. The method 300 can then proceed back to 305, 310.

At 365, the controller 260 determines whether the vehicle power network 204 in combination with the auxiliary power network 206 can supply a sufficient amount of power to operate the vehicle powered transport climate control system in a limited capacity mode. When the vehicle power network 204 in combination with the auxiliary power network 206 can supply a sufficient amount of power to operate the vehicle powered transport climate control system in the limited capacity mode, the method proceeds to 355. When the vehicle power network 204 in combination with the auxiliary power network 206 cannot supply a sufficient amount of power to operate the vehicle powered transport climate control system in the limited capacity mode, the method proceeds to 360.

Accordingly, the method 300 can allow the power system 200 to augment power supplied from the vehicle power network 204 with power supplied from the auxiliary power network 204 to power the vehicle powered transport climate control system. This is despite the vehicle power network 204 never supplying a sufficient amount of power to completely power the vehicle powered transport climate control system operating at a full capacity.

Aspects:

It is to be appreciated that any of aspects 1-9 can be combined with any of aspects 10-18.

Aspect 1. A method for powering a vehicle powered transport climate control system of a refrigerated transport unit using a vehicle power network that powers a vehicle towing the refrigerated transport unit and an auxiliary power network, the method comprising:

determining an amount of power requested by a load of the vehicle powered transport climate control system;

determining a vehicle power amount available from the vehicle power network;

calculating an auxiliary power amount from the auxiliary power network to augment the vehicle power amount from the vehicle power network;

converting power from the vehicle power network and power from the auxiliary power network into a load power; and supplying the load power to the load of the vehicle powered transport climate control system, wherein a maximum amount of vehicle power available from the vehicle power network is less than a maximum amount of power required by the load of the vehicle powered transport climate control system.

Aspect 2. The method of aspect 1, wherein converting the power from the vehicle power network and the power from the auxiliary power network into the load power includes converting the power from the vehicle power network from a vehicle network voltage to a load power voltage and converting the power from the auxiliary power network from an auxiliary network voltage to the load power voltage.

Aspect 3. The method of any one of aspects 1 and 2, wherein converting the power from the vehicle power network and the power from the auxiliary power network into the load power includes converting the power from the vehicle power network from a vehicle network DC voltage to a load power DC voltage and converting the power from the auxiliary power network from an auxiliary network DC voltage to the load power DC voltage.

Aspect 4. The method of any one of aspects 1-3, further comprising determining whether vehicle network power from the vehicle power network is available to the vehicle powered transport climate control system, and operating the vehicle powered transport climate control system in a limited capacity mode when vehicle network power from the vehicle power network is unavailable.

Aspect 5. The method of aspect 4, further comprising determining whether the auxiliary power network can supply a sufficient amount of power to operate the vehicle powered transport climate control system in the limited capacity mode, and stopping operation of the vehicle powered transport control system when the auxiliary power network cannot supply a sufficient amount of power to operate the vehicle powered transport climate control system in the limited capacity mode.

Aspect 6. The method of any one of aspects 1-5, further comprising determining whether the vehicle power amount is at or above an expected power threshold, and operating the vehicle powered transport climate control system in a limited capacity mode when vehicle network power from the vehicle power network is unavailable.

Aspect 7. The method of aspect 6, further comprising determining whether the auxiliary power network combined with the vehicle power network can supply a sufficient amount of power to operate the vehicle powered transport climate control system in the limited capacity mode, and stopping operation of the vehicle powered transport control system when the auxiliary power network combined with the vehicle power network cannot supply a sufficient amount of power to operate the vehicle powered transport climate control system in the limited capacity mode.

Aspect 8. The method of any one of aspects 1-7, wherein the load of the vehicle powered transport climate control system includes one or more of a compressor, an evaporator blower, and a condenser fan.

Aspect 9. The method of any one of aspects 1-8, further comprising converting a portion of the load power to an AC load power that is compatible with an AC load of the vehicle powered transport climate control system, and supplying the AC load power to the AC load.

Aspect 10. A refrigerated transport unit towed by a vehicle, the refrigerated transport unit comprising:

a vehicle powered transport climate control system for providing climate control to an internal space of the refrigerated transport unit, the vehicle powered transport climate control system including:

a refrigeration circuit including a compressor, an evaporator, a condenser and an expansion valve; and a power system for powering the vehicle powered transport climate control system, the power system including:

a power conversion module configured to receive power from a vehicle power network that is configured to power a vehicle that tows the refrigerated transport unit and from an auxiliary power network, a controller configured to:

determine an amount of power requested by a load of the vehicle powered transport climate control system, determine a vehicle power amount available from the vehicle power network, and calculate an auxiliary power amount from the auxiliary power network to augment the vehicle power amount from the vehicle power network, wherein the power conversion module is configured to convert power from the vehicle power network and power from the auxiliary power network into a load power, wherein the power conversion module is configured to supply the load power to the load of the vehicle powered transport climate control system, and wherein a maximum amount of vehicle power available from the vehicle power network is less than a maximum amount of power required by the load of the vehicle powered transport climate control system.

Aspect 11. The refrigerated transport unit of aspect 10, wherein the power conversion module is configured to convert the power from the vehicle power network from a vehicle network voltage to a load power voltage and convert the power from the auxiliary power network from an auxiliary network voltage to the load power voltage.

Aspect 12. The refrigerated transport unit of any one of aspects 10 and 11, wherein the power conversion module is configured to convert the power from the vehicle power network from a vehicle network DC voltage to a load power DC voltage and convert the power from the auxiliary power network from an auxiliary network DC voltage to the load power DC voltage.

Aspect 13. The refrigerated transport unit of any one of aspects 10-12, wherein the controller is configured to:

determine whether vehicle network power from the vehicle power network is available to the vehicle powered transport climate control system, and control operation of the vehicle powered transport climate control system in a limited capacity mode when vehicle network power from the vehicle power network is unavailable.

Aspect 14. The refrigerated transport unit of aspect 13, wherein the controller is configured to:

determine whether the auxiliary power network can supply a sufficient amount of power to operate the vehicle powered transport climate control system in the limited capacity mode, and stop operation of the vehicle powered transport control system when the auxiliary power network cannot supply a sufficient amount of power to operate the vehicle powered transport climate control system in the limited capacity mode.

Aspect 15. The refrigerated transport unit of any one of aspects 10-14, wherein the controller is configured to:

determine whether the vehicle power amount is at or above an expected power threshold, and control operation of the vehicle powered transport climate control system in a limited capacity mode when vehicle network power from the vehicle power network is unavailable.

Aspect 16. The refrigerated transport unit of aspect 15, wherein the controller is configured to:

determine whether the auxiliary power network combined with the vehicle power network can supply a sufficient amount of power to operate the vehicle powered transport climate control system in the limited capacity mode, and stop operation of the vehicle powered transport control system when the auxiliary power network combined with the vehicle power network cannot supply a sufficient amount of power to operate the vehicle powered transport climate control system in the limited capacity mode.

Aspect 17. The refrigerated transport unit of any one of aspects 10-16, wherein the load of the vehicle powered transport climate control system includes one or more of the compressor, an evaporator blower, and a condenser fan.

Aspect 18. The refrigerated transport unit of any one of aspects 10-17, wherein the power conversion module is configured to:

convert a portion of the load power to an AC load power that is compatible with an AC load of the vehicle powered transport climate control system, and supply the AC load power to the AC load.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for powering a vehicle powered transport climate control system of a refrigerated transport unit using a vehicle power network that powers a vehicle towing the refrigerated transport unit and an auxiliary power network, the method comprising:

determining an amount of power requested by a load of the vehicle powered transport climate control system;

determining a vehicle power amount available from the vehicle power network;

calculating an auxiliary power amount from the auxiliary power network to augment the vehicle power amount from the vehicle power network;

converting power from the vehicle power network and power from the auxiliary power network into a load power;

supplying the load power to the load of the vehicle powered transport climate control system;

determining whether the vehicle power amount is at or above an expected power threshold, and when the vehicle power amount is at or above the expected power threshold, operating the vehicle powered transport climate control system in a full capacity mode using power from the vehicle power network and power from the auxiliary power network;

wherein a maximum amount of vehicle power available from the vehicle power network is always insufficient to run the vehicle powered transport climate control system when the vehicle powered transport climate control system is operating at a full capacity.

2. The method of claim 1, wherein converting the power from the vehicle power network and the power from the auxiliary power network into the load power includes converting the power from the vehicle power network from a vehicle network voltage to a load power voltage and converting the power from the auxiliary power network from an auxiliary network voltage to the load power voltage.

3. The method of claim 1, wherein converting the power from the vehicle power network and the power from the auxiliary power network into the load power includes converting the power from the vehicle power network from a vehicle network DC voltage to a load power DC voltage and converting the power from the auxiliary power network from an auxiliary network DC voltage to the load power DC voltage.

4. The method of claim 1, further comprising determining whether vehicle network power from the vehicle power network is available to the vehicle powered transport climate control system, and operating the vehicle powered transport climate control system in a limited capacity mode when vehicle network power from the vehicle power network is unavailable.

5. The method of claim 4, further comprising determining whether the auxiliary power network can supply a sufficient amount of power to operate the vehicle powered transport climate control system in the limited capacity mode, and stopping operation of the vehicle powered transport control system when the auxiliary power network cannot supply a sufficient amount of power to operate the vehicle powered transport climate control system in the limited capacity mode.

6. The method of claim 1, further comprising determining whether the vehicle power amount is at or above an expected power threshold, and operating the vehicle powered transport climate control system in a limited capacity mode when vehicle network power from the vehicle power network is unavailable.

7. The method of claim 6, further comprising determining whether the auxiliary power network combined with the vehicle power network can supply a sufficient amount of power to operate the vehicle powered transport climate control system in the limited capacity mode, and stopping operation of the vehicle powered transport control system when the auxiliary power network combined with the vehicle power network cannot supply a sufficient amount of power to operate the vehicle powered transport climate control system in the limited capacity mode.

8. The method of claim 1, wherein the load of the vehicle powered transport climate control system includes one or more of a compressor, an evaporator blower, and a condenser fan.

9. The method of claim 1, further comprising converting a portion of the load power to an AC load power that is compatible with an AC load of the vehicle powered transport climate control system, and supplying the AC load power to the AC load.

10. A refrigerated transport unit towed by a vehicle, the refrigerated transport unit comprising:

a vehicle powered transport climate control system for providing climate control to an internal space of the refrigerated transport unit, the vehicle powered transport climate control system including:

a refrigeration circuit including a compressor, an evaporator, a condenser and an expansion valve; and a power system for powering the vehicle powered transport climate control system, the power system including:

a power conversion module configured to receive power from a vehicle power network that is configured to power a vehicle that tows the refrigerated transport unit and from an auxiliary power network, a controller configured to:
determine an amount of power requested by a load of the vehicle powered transport climate control system,
determine a vehicle power amount available from the vehicle power network,
calculate an auxiliary power amount from the auxiliary power network to augment the vehicle power amount from the vehicle power network,
determine whether the vehicle power amount is at or above an expected power threshold, and
when the vehicle power amount is at or above the expected power threshold, operate the vehicle powered transport climate control system in a full capacity mode using power from the vehicle power network and power from the auxiliary power network;

wherein the power conversion module is configured to convert power from the vehicle power network and power from the auxiliary power network into a load power,
wherein the power conversion module is configured to supply the load power to the load of the vehicle powered transport climate control system, and
wherein a maximum amount of vehicle power available from the vehicle power network is always insufficient to run the vehicle powered transport climate control system when the vehicle powered transport climate control system is operating at a full capacity.

11. The refrigerated transport unit of claim 10, wherein the power conversion module is configured to convert the power from the vehicle power network from a vehicle network voltage to a load power voltage and convert the power from the auxiliary power network from an auxiliary network voltage to the load power voltage.

12. The refrigerated transport unit of claim 10, wherein the power conversion module is configured to convert the power from the vehicle power network from a vehicle network DC voltage to a load power DC voltage and convert the power from the auxiliary power network from an auxiliary network DC voltage to the load power DC voltage.

13. The refrigerated transport unit of claim 10, wherein the controller is configured to:
determine whether vehicle network power from the vehicle power network is available to the vehicle powered transport climate control system, and
control operation of the vehicle powered transport climate control system in a limited capacity mode when vehicle network power from the vehicle power network is unavailable.

14. The refrigerated transport unit of claim 13, wherein the controller is configured to:
determine whether the auxiliary power network can supply a sufficient amount of power to operate the vehicle powered transport climate control system in the limited capacity mode, and
stop operation of the vehicle powered transport control system when the auxiliary power network cannot supply a sufficient amount of power to operate the vehicle powered transport climate control system in the limited capacity mode.

15. The refrigerated transport unit of claim 10, wherein the controller is configured to:
determine whether the vehicle power amount is at or above an expected power threshold, and
control operation of the vehicle powered transport climate control system in a limited capacity mode when vehicle network power from the vehicle power network is unavailable.

16. The refrigerated transport unit of claim 15, wherein the controller is configured to:
determine whether the auxiliary power network combined with the vehicle power network can supply a sufficient amount of power to operate the vehicle powered transport climate control system in the limited capacity mode, and
stop operation of the vehicle powered transport control system when the auxiliary power network combined with the vehicle power network cannot supply a sufficient amount of power to operate the vehicle powered transport climate control system in the limited capacity mode.

17. The refrigerated transport unit of claim 10, wherein the load of the vehicle powered transport climate control system includes one or more of the compressor, an evaporator blower, and a condenser fan.

18. A refrigerated transport unit towed by a vehicle, the refrigerated transport unit comprising:
a vehicle powered transport climate control system for providing climate control to an internal space of the refrigerated transport unit, the vehicle powered transport climate control system including:
a refrigeration circuit including a compressor, an evaporator, a condenser and an expansion valve; and
a power system for powering the vehicle powered transport climate control system, the power system including:
a power conversion module configured to receive power from a vehicle power network that is configured to power a vehicle that tows the refrigerated transport unit and from an auxiliary power network,
a controller configured to:
determine an amount of power requested by a load of the vehicle powered transport climate control system,
determine a vehicle power amount available from the vehicle power network,
calculate an auxiliary power amount from the auxiliary power network to augment the vehicle power amount from the vehicle power network,
determine whether the vehicle power amount is at or above an expected power threshold, and
when the vehicle power amount is at or above the expected power threshold, operate the vehicle powered transport climate control system in a full capacity mode using power from the vehicle power network and power from the auxiliary power network;

wherein the power conversion module is configured to convert power from the vehicle power network and power from the auxiliary power network into a load power,
wherein the power conversion module is configured to supply the load power to the load of the vehicle powered transport climate control system, and
wherein a maximum amount of vehicle power available from the vehicle power network is always insufficient to run the vehicle powered transport climate control system when the vehicle powered transport climate control system is operating at a full capacity, and wherein the power conversion module is configured to:
convert a portion of the load power to an AC load power that is compatible with an AC load of the vehicle powered transport climate control system, and
supply the AC load power to the AC load.

* * * * *